P. B. DEAN.
GAFF HOOK.
APPLICATION FILED DEC. 6, 1917.
1,274,013.
Patented July 30, 1918.
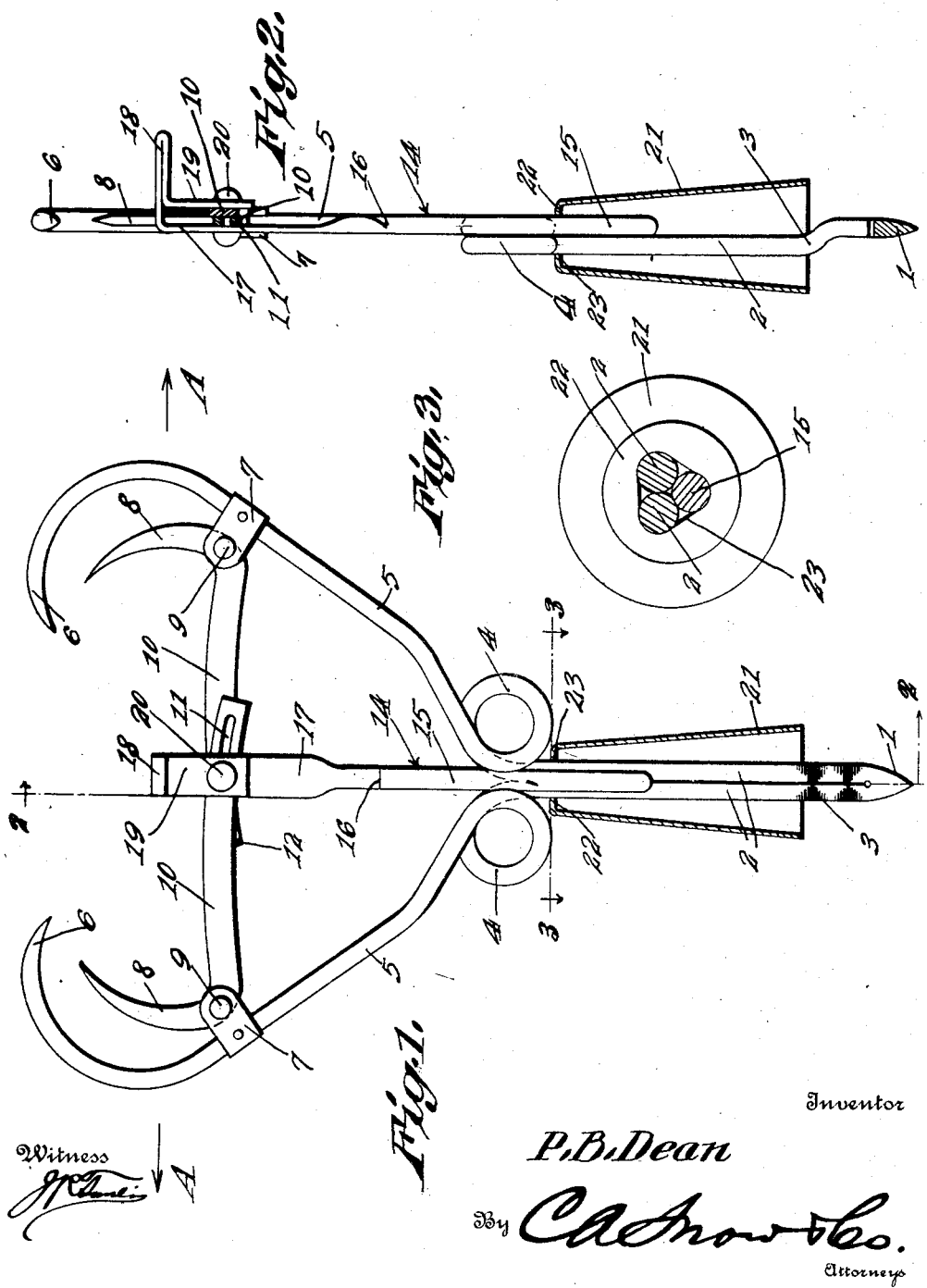
Inventor
P. B. Dean
By C. A. Snow & Co.
Attorneys

10

UNITED STATES PATENT OFFICE.

PHILETUS BOONE DEAN, OF FREDONIA, NEW YORK.

GAFF-HOOK.

1,274,013.

Specification of Letters Patent.

Patented July 30, 1918.

Application filed December 6, 1917. Serial No. 205,838.

*To all whom it may concern:*

Be it known that I, PHILETUS BOONE DEAN, a citizen of the United States, residing at Fredonia, in the county of Chautauqua and State of New York, have invented a new and useful Gaff-Hook, of which the following is a specification.

The device forming the subject matter of this application is a gaff hook adapted to be employed for holding fish and for other purposes, and one object of the invention is to improve the construction of the spreader whereby the jaws are separated, novel means being provided for holding the jaws closed, and means being provided whereby the jaws may be opened and spread apart, after the jaws have been separated by the action of the spreader.

It is within the province of this disclosure to improve generally and to enhance the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 shows in side elevation, the gaff hook constructed in accordance with the present invention, the ferrule being in section;

Fig. 2 is a section taken approximately on the line 2—2 of Fig. 1;

Fig. 3 is a cross section taken on the line 3—3 of Fig. 1.

The device forming the subject matter of this application is fashioned from a rod, bent upon itself and pointed as shown at 1, to form arms 2, which, taken together, constitute a shank. The shank above defined is offset laterally, as shown at 3, in Fig. 2, to form a cam. The outer ends of the arms 2 are continued to form helical springs 4 which merge into main jaws 5 having hook shaped ends 6.

Yokes 7 are secured to the main jaws 5. L shaped auxiliary jaws 8 are pivoted as shown at 9, at their angles, to the yokes 7, the auxiliary jaws 8 including body portions 10 which extend toward each other, the bodies 10 of the auxiliary jaws being overlapped at their inner ends, and the inner ends of the body portions of the auxiliary jaws being equipped with longitudinal slots 11. The body portions 10 of the auxiliary jaws 8 are provided with laterally projecting lugs 12, the lug on one body portion 10 being adapted to coact with the edge of the other body portion 10, for a purpose which will be set forth hereinafter.

The numeral 14 denotes a spreader, including a rod-like body 15 having a side seat or notch 16. The outer end of the body 15 of the spreader broadens to form a head 17, bent rectangularly to form a double-walled extension 18, one wall of the extension 18 being prolonged to form an arm 19 disposed parallel to the head 17. The inner ends of the bodies 10 of the auxiliary jaws 8 are received between the head 17 and the arm 19. The arm 19 and the head 17 carry a pivot element 20 mounted in the slots 11 of the body portions 10 of the auxiliary jaws 8.

The numeral 21 denotes the ferrule or support, having an end wall 22 provided with an opening 23. The ferrule 21 is adapted to be assembled with a handle (not shown). The shank, comprising the arms 2, extends into the ferrule 21, through the opening 23, and the body portion 15 of the spreader 14 slides in the opening 23, in contact with the arms 2. In practical operation, the extension 18 is hooked over the gunwale of a boat or over any other object. In this way, the spreader 14 is pulled outwardly, motion being transmitted to the auxiliary jaws 8 by means of the pivot element 20, and the structure being disposed in the opened position of Fig. 1, the lug 12 on one of the parts 10 cooperating with the edge of the other part 10, to limit the outward movement of the spreader 14. It is to be observed that after the structure has been opened, as shown in Fig. 1, the jaws 8 may be spread apart in the direction of the arrows A to permit the admission of an unusually large object, the pivot element 20 moving in slots 11. When an object is thrust against the extension 10, the spreader 14 moves inwardly, the inner end of the body 15 of the spreader ultimately engaging the cam 3. Owing to the coöperating between the cam 3 and the inner end of the spreader 14, the spreader 14 is moved laterally, and the seat 16 engages with the end wall 22 of the ferrule, thus locking the jaws 8 in a closed position. In order to open the jaws 5, the spreader 14 is sprung laterally, so as to disengage the seat 16 from the end walls 22 of the ferrule 21.

Having thus described the invention, what is claimed is:—

1. A gaff hook comprising a support; a shank in the support and provided with main jaws, the shank having a cam; auxiliary members pivoted to the main jaws; and a spreader pivoted to the inner ends of the auxiliary members, the spreader being slidable longitudinally in the support, the spreader coöperating with the cam when the spreader moves inwardly, thereby to move the spreader transversely against the support and to hold the jaws against opening.

2. A gaff hook comprising a shank having jaws; auxiliary members pivoted to the jaws; a spreader slidable longitudinally of the shank; and a pivot element carried by the spreader, the inner ends of the auxiliary members having longitudinal slots receiving the pivot element and permitting a separation of the jaws after the jaws have been opened, one auxiliary member having a projection engaging the other auxiliary member to limit the outward movement of the spreader.

3. A gaff hook comprising a shank having jaws; auxiliary members pivoted to the jaws; a spreader slidable longitudinally of the shank; and means for pivotally connecting the spreader with the inner ends of the auxiliary members, the spreader being provided, adjacent said means, with a lateral extension, adapted to be engaged with an object, to impart a longitudinal movement to the spreader, and to secure an opening of the jaws.

4. A gaff hook comprising a shank having jaws; auxiliary members pivoted to the jaws; a spreader slidable longitudinally of the shank, the spreader being provided at its outer end with a double-walled angularly disposed extension, one wall of which is prolonged to form an arm disposed approximately parallel to the main portion of the spreader, the inner ends of the auxiliary members lying between the main portion of the spreader and the arm; and a pivot element uniting the auxiliary members at their inner ends with the main portion of the spreader and the arm thereof.

In testimony that I claim the foregoing as my own, I have hereto affixed my signature in the presence of two witnesses.

PHILETUS BOONE DEAN.

Witnesses:
A. E. SPENCER,
J. M. SPENCER.

Copies of this patent may be obtained for five cents each, by addressing the "Commissioner of Patents, Washington, D. C."